US012579728B2

(12) United States Patent
Barnard et al.

(10) Patent No.: US 12,579,728 B2
(45) Date of Patent: Mar. 17, 2026

(54) MEMORY ALLOCATION FOR RECURSIVE PROCESSING IN A RAY TRACING SYSTEM

(71) Applicant: Imagination Technologies Limited, Kings Langley (GB)

(72) Inventors: Daniel Barnard, Hemel Hempstead (GB); Alistair Goudie, Hemel Hempstead (GB)

(73) Assignee: Imagination Technologies Limited, Kings Langley (GB)

( * ) Notice: Subject to any disclaimer, the term of this patent is extended or adjusted under 35 U.S.C. 154(b) by 266 days.

(21) Appl. No.: 17/484,597

(22) Filed: Sep. 24, 2021

(65) Prior Publication Data

US 2022/0114780 A1 Apr. 14, 2022

(30) Foreign Application Priority Data

Sep. 24, 2020 (GB) ...................................... 2015137

(51) Int. Cl.
*G06T 15/06* (2011.01)
*G06T 15/00* (2011.01)

(52) U.S. Cl.
CPC ............ *G06T 15/06* (2013.01); *G06T 15/005* (2013.01)

(58) Field of Classification Search
None
See application file for complete search history.

(56) References Cited

U.S. PATENT DOCUMENTS

| | | | | |
|---|---|---|---|---|
| 8,174,524 B1* | 5/2012 | Laur | ...................... | G06T 15/06 |
| | | | | 345/419 |
| 8,817,026 B1* | 8/2014 | Zimmerman | ........... | G06T 15/06 |
| | | | | 345/426 |
| 8,854,369 B2* | 10/2014 | Peterson | ................. | G06T 15/06 |
| | | | | 345/426 |
| 9,104,500 B1 | 8/2015 | Krikellas et al. | | |
| 10,769,750 B1* | 9/2020 | Yoon | ......................... | G06T 1/20 |
| 2017/0178398 A1* | 6/2017 | Afra | ........................ | G06T 15/80 |

(Continued)

FOREIGN PATENT DOCUMENTS

| | | |
|---|---|---|
| EP | 3457280 A1 | 3/2019 |
| EP | 3608879 A1 | 2/2020 |

OTHER PUBLICATIONS

Barringer et al., "Ray Accelerator: Efficient and Flexible Ray Tracing on a Heterogeneous Architecture," Oct. 2016, Computer Graphics Forum, vol. 36, pp. 166-177 (Year: 2016).*

*Primary Examiner* — Andrew G Yang
(74) *Attorney, Agent, or Firm* — Potomac Law Group, PLLC; Vincent M DeLuca

(57) ABSTRACT

Ray tracing systems and methods are described for processing rays. A parent shader is executed for a ray. The parent shader includes a shader recursion instruction which invokes a child shader. The execution of the parent shader for the ray is suspended. Intermediate data for the parent shader is stored in a heap of memory, wherein the intermediate data comprises state data and payload data. Storing intermediate data comprises allocating a first set of registers in the heap of memory for storing payload data, and allocating a second set of registers in the heap of memory for storing state data. When the parent shader is ready to resume, intermediate data for the parent shader is read from the heap of memory, and the execution of the parent shader for the ray is resumed.

20 Claims, 6 Drawing Sheets

(56)  References Cited

U.S. PATENT DOCUMENTS

| 2017/0309059 A1* | 10/2017 | Howson | G06T 1/20 |
| 2017/0372448 A1* | 12/2017 | Wald | G06T 15/06 |
| 2020/0043218 A1* | 2/2020 | Vaidyanathan | G06T 15/06 |
| 2021/0287417 A1* | 9/2021 | Afra | G06T 5/002 |
| 2021/0398340 A1* | 12/2021 | Muthler | G06T 17/10 |
| 2021/0407175 A1* | 12/2021 | Saleh | G06T 15/40 |
| 2022/0058854 A1* | 2/2022 | Cerny | G06T 15/06 |

* cited by examiner

Heap of memory for storing state data and payload data

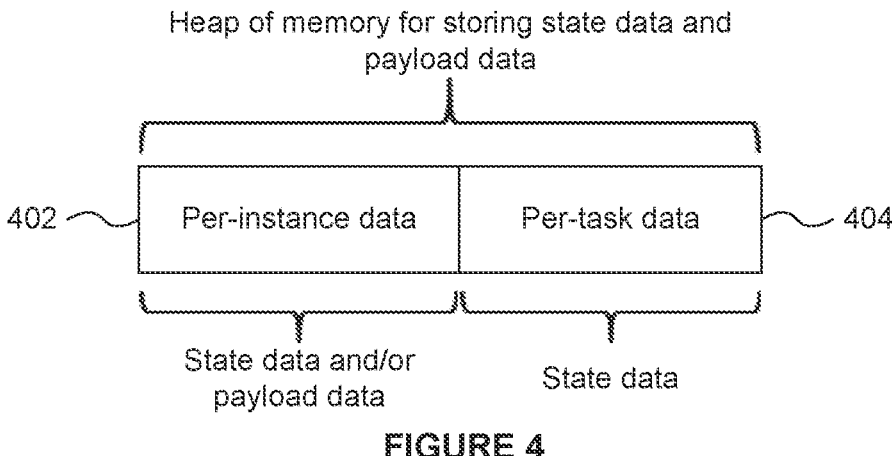

402 ~ Per-instance data | Per-task data ~ 404

State data and/or payload data

State data

FIGURE 4

| Shader | Incoming payload | Local payload | Heap of memory |
|---|---|---|---|
| Ray generation shader ~502 | None | A | • Payload A<br>• ray gen shader state |
| *TraceRay(A)* | | | |
| Closest hit shader ~504 | A | B | • Payload A<br>• ray gen shader state<br>• Payload B<br>• Closest hit shader state |
| *TraceRay(A or B)* | | | |
| Miss shader ~506 | A or B | None | • Payload A<br>• ray gen shader state<br>• Payload B<br>• Closest hit shader state |

FIGURE 5

| Grouping factor | Register no. | Data type |
|---|---|---|
| GF=6 | 0 | Origin |
| | 1 | |
| | 2 | |
| | 3 | Direction |
| | 4 | |
| | 5 | |
| GF=2 | 6 | Temporary registers |
| | 7 | |
| GF=3 | 8 | Parent payload |
| | 9 | |
| | 10 | |
| GF=4 | 11 | Child payload |
| | 12 | |
| | 13 | |
| | 14 | |

FIGURE 6a

MEMORY ALLOCATION FOR RECURSIVE PROCESSING IN A RAY TRACING SYSTEM

FIELD

The present disclosure is directed to allocating memory for recursive processing in a ray tracing system.

BACKGROUND

Ray tracing is a computational rendering technique for rendering an image of a scene by tracing paths of light ('rays') through the scene, e.g. from a viewpoint from which the image of the scene is being rendered. A ray can be modelled as originating from the viewpoint and passing through a sample position of a rendering space into the scene. Each pixel of the image being rendered may correspond to one or more sample positions of the rendering space. A ray that originates from the viewpoint is referred to as a "primary ray". FIG. 1 shows how rays are processed in a ray tracing system. In step S102, a ray generation shader is executed for one or more primary rays in order to process the ray(s). A "shader" (which may be referred to as a "shader program") is a software module comprising one or more computer-readable instructions which can be executed on a processing unit. The functionality performed by a shader is flexible and is defined by a programmer who writes the code of the shader. As a ray traverses the scene it may intersect one or more objects within the scene. The interaction between a ray and an object it intersects can be modelled to create realistic visual effects. For example, the first shader to be executed for a primary ray (a "ray generation shader") may include an instruction (a "TraceRay" instruction) which causes an intersection testing process to be performed, in step S104, to thereby find one or more intersections of the ray with one or more objects in the scene. The intersection testing process could be performed in hardware or software, but is typically performed in hardware (e.g. using fixed-function circuitry) because efficiency of processing is typically considered to be more important than flexibility in functionality for the intersection testing process. In response to finding an intersection of a ray with an object, in step S106, a shader is executed in respect of the intersection. The shader that is executed (or "run") in step S106 may be a closest hit shader, a miss shader, an intersection shader or an any hit shader, which are defined in the Vulkan and DirectX ray tracing specifications. A programmer writes the shader programs to define how the system reacts to the intersections. The shader that is executed in step S106 may include a TraceRay instruction, which causes one or more further rays (referred to as "secondary rays") to be emitted into the scene, e.g. to represent a reflection of the ray off the intersected object or a refraction of the ray through the object (e.g. if the object is transparent or translucent). As another example, the shader program could cause one or more rays to be emitted into the scene for the purposes of determining whether the object is in shadow at the intersection point. Therefore, the method can pass from step S106 back to step S104 as shown by the dashed line in FIG. 1 denoted "TraceRay". When an intersection is found for a secondary ray (in step S104) then another shader can be executed (in step S106). In this way, the method recursively passes between steps S106 and S104 when TraceRay instructions are included in the shaders that are executed in step S106.

A ray is described by data defining the ray origin, ray direction, a maximum culling distance ("Tmax") and a minimum culling distance ("Tmin"). A ray is accompanied by a user defined payload that is modifiable as the ray interacts with geometry in the scene and is visible to the caller of a TraceRay instruction. Furthermore, according to the Vulkan and DirectX ray tracing specifications, the shaders that are executed in step S106 may include one or more "CallShader" instructions, which cause another shader to be executed. Therefore, one shader can call another shader so the method can recursively pass between different shaders as shown by the dashed line in FIG. 1 denoted "CallShader". When all of the shaders for a primary ray have completed then an output for the primary ray is provided. This output may be a rendered value, e.g. pixel colour, which is to be used for the pixel corresponding to the primary ray. In this way, rendered values representing the pixels of the image of the scene are determined.

Vulkan and Direct X are application programming interfaces (APIs) for 3D graphics processing, which have ray tracing extensions defining how programmers can use ray tracing systems to render images of 3D scenes. These APIs have opened up the concept of shader recursion for use in ray tracing systems. As described above, shader recursion occurs when an instruction implemented within a shader causes one or more other shaders to be invoked. The invoked shader (which may be referred to as a "child" shader) is treated like a function call in which control will eventually return back to the invoking shader (which may be referred to as a "parent" shader). Payload data can be passed from a parent shader to a child shader, and the child shader can communicate back to the parent shader by updating the payload data.

When shader recursion is used, some intermediate data for the parent shader is maintained, so the parent shader can continue its execution when the child shader has completed its execution. Many rays may be processed in parallel in a ray tracing system. Furthermore, in order to achieve realistic rendering results, ray tracing systems can allow large recursion depths, e.g. up to a maximum recursion depth of 31. As such, the lifetime of the intermediate data for a parent shader may be very long, and at any given time there may be many shaders for which intermediate data is being maintained.

SUMMARY

This summary is provided to introduce a selection of concepts that are further described below in the detailed description. This summary is not intended to identify key features or essential features of the claimed subject matter, nor is it intended to be used to limit the scope of the claimed subject matter.

There is provided a method of processing rays in a ray tracing system, the method comprising:

executing a parent shader for a ray, wherein the parent shader includes a shader recursion instruction which invokes a child shader;

suspending the execution of the parent shader for the ray;

storing intermediate data for the parent shader in a heap of memory, wherein the intermediate data comprises state data and payload data, wherein said storing intermediate data comprises allocating a first set of registers in the heap of memory for storing payload data, and allocating a second set of registers in the heap of memory for storing state data; and when the parent shader is ready to resume, reading intermediate data for the parent shader from the heap of memory, and resuming the execution of the parent shader for the ray.

The method may further comprise executing the child shader for the ray, whilst the parent shader is suspended.

The shader recursion instruction may indicate payload data for the child shader. The execution of the child shader for the ray may update at least some of the indicated payload data. The method may further comprise passing control of a subset of registers of the heap of memory from the parent shader to the child shader, wherein the subset of registers may store the indicated payload data. The indicated payload data may be an incoming payload object that the parent shader has received from a grandparent shader for the ray, wherein the execution of the child shader for the ray may directly update the incoming payload object. The execution of the child shader for the ray might not update a payload object that is local to the parent shader. The indicated payload data may be a local payload object that the parent shader has generated for the ray, wherein the execution of the child shader for the ray may update the local payload object.

A shader may be executed for a plurality of rays by executing a task, wherein the task may comprise a plurality of instances corresponding to the plurality of rays for which the shader is executed. The registers in the heap of memory may be allocated for storing either per-instance data or per-task data. The per-instance data may comprise one or both of state data and payload data, and wherein the per-task data may comprise state data.

Groups of contiguous per-instance registers in the heap of memory may be allocated for storing subsets of the per-instance data for the instances of the task, wherein a particular group of contiguous per-instance registers may be allocated for storing a respective particular subset of the per-instance data for each of the instances of the task.

Each of the subsets of the per-instance data may comprise data of a respective particular type, such that per-instance data of a first type may be stored for the instances of the task in a first group of contiguous per-instance registers in the heap of memory, and per-instance data of a second type may be stored for the instances of the task in a second group of contiguous per-instance registers in the heap of memory.

The parent shader may be executed by executing a parent task, and the child shader may be executed by executing a child task, and wherein one of the groups of contiguous per-instance registers may comprise per-instance registers allocated for storing child payload data for each of the instances of the parent task, and wherein the child task may access the child payload data by accessing said one of the groups of contiguous per-instance registers.

There may be four groups of contiguous per-instance registers, wherein:

a first of the groups of contiguous per-instance registers may comprise per-instance registers allocated for storing ray origin and direction data for each of the instances of the task, a second of the groups of contiguous per-instance registers may comprise per-instance registers allocated for storing temporary register data for each of the instances of the task, a third of the groups of contiguous per-instance registers may comprise per-instance registers allocated for storing parent payload data for each of the instances of the task, and a fourth of the groups of contiguous per-instance registers may comprise per-instance registers allocated for storing child payload data for each of the instances of the task.

The method may further comprise: determining that a first subset of temporary register data is used in a loop operation; and determining that a second subset of temporary register data is not used in the loop operation; wherein one of the groups of contiguous per-instance registers may comprise per-instance registers allocated for storing the first subset of temporary register data for each of the instances of the task, and wherein another one of the groups of contiguous per-instance registers may comprise per-instance registers allocated for storing the second subset of temporary register data for each of the instances of the task.

There is provided a ray tracing system configured to process rays, wherein the ray tracing system comprises:

processing logic; and a heap of memory;

wherein the processing logic is configured to:

execute a parent shader for a ray, wherein the parent shader includes a shader recursion instruction which invokes a child shader;

suspend the execution of the parent shader for the ray;

identify intermediate data for the parent shader which is to be stored in the heap of memory, wherein the intermediate data comprises state data and payload data, allocate a first set of registers in the heap of memory for storing payload data;

allocate a second set of registers in the heap of memory for storing state data;

cause the intermediate data to be stored in the heap of memory in accordance with the allocations of the first set of registers and the second set of registers; and when the parent shader is ready to resume, read intermediate data for the parent shader from the heap of memory, and resume the execution of the parent shader for the ray.

The shader recursion instruction may indicate payload data for the child shader, wherein the processing logic may be further configured to pass control of a subset of registers of the heap of memory from the parent shader to the child shader, wherein the subset of registers may store the indicated payload data.

The processing logic may be configured to execute a shader for a plurality of rays by executing a task, wherein the task may comprise a plurality of instances corresponding to the plurality of rays for which the shader is executed.

The registers in the heap of memory may be allocated for storing either per-instance data or per-task data.

There may be provided a method of processing tasks in a ray tracing system, wherein each task comprises one or more instances corresponding to a respective one or more rays, the method comprising:

executing a parent task which invokes a child task and indicates payload data to the child task;

storing intermediate data for the parent task in a heap of memory, wherein the intermediate data comprises one or more items of state data and one or more items of payload data, wherein said storing intermediate data comprises dynamically allocating registers in the heap of memory for storing either state data or payload data; and when the parent task is ready to resume, reading intermediate data for the parent task from the heap of memory, and resuming the execution of the parent task.

There may be provided a ray tracing system configured to perform any of the methods described herein.

There may be provided a method of manufacturing, using an integrated circuit manufacturing system, a ray tracing system described herein, the method comprising:

processing, using a layout processing system, a computer readable description of the ray tracing system so as to generate a circuit layout description of an integrated circuit embodying the ray tracing system; and manufacturing, using an integrated circuit generation system, the ray tracing system according to the circuit layout description.

The ray tracing units and ray tracing systems described herein may be embodied in hardware on an integrated circuit. There may be provided a method of manufacturing, at an integrated circuit manufacturing system, a ray tracing unit or a ray tracing system as described herein. There may be provided an integrated circuit definition dataset that, when processed in an integrated circuit manufacturing system, configures the system to manufacture a ray tracing unit or a ray tracing system as described herein. There may be provided a non-transitory computer readable storage medium having stored thereon a computer readable description of a ray tracing unit or a ray tracing system that, when processed in an integrated circuit manufacturing system, causes the integrated circuit manufacturing system to manufacture an integrated circuit embodying the ray tracing unit or the ray tracing system.

There may be provided an integrated circuit manufacturing system comprising: a non-transitory computer readable storage medium having stored thereon a computer readable description of a ray tracing unit or a ray tracing system as described herein; a layout processing system configured to process the computer readable description so as to generate a circuit layout description of an integrated circuit embodying the ray tracing unit or the ray tracing system; and an integrated circuit generation system configured to manufacture the ray tracing unit or the ray tracing system according to the circuit layout description.

There may be provided computer program code for performing any of the methods described herein. There may be provided a non-transitory computer readable storage medium having stored thereon computer readable instructions that, when executed at a computer system, cause the computer system to perform any of the methods described herein.

The above features may be combined as appropriate, as would be apparent to a skilled person, and may be combined with any of the aspects of the examples described herein.

BRIEF DESCRIPTION OF THE DRAWINGS

The present invention is described by way of example with reference to the accompanying drawings. In the drawings:

FIG. 4 illustrates a heap of memory for storing state data and payload data;

FIG. 5 shows a sequence of three shaders to illustrate how intermediate data is stored in the heap of memory as the ray tracing process proceeds through the sequence of three shaders;

FIG. 6*a* shows subsets of per-instance data;

Figure 1:
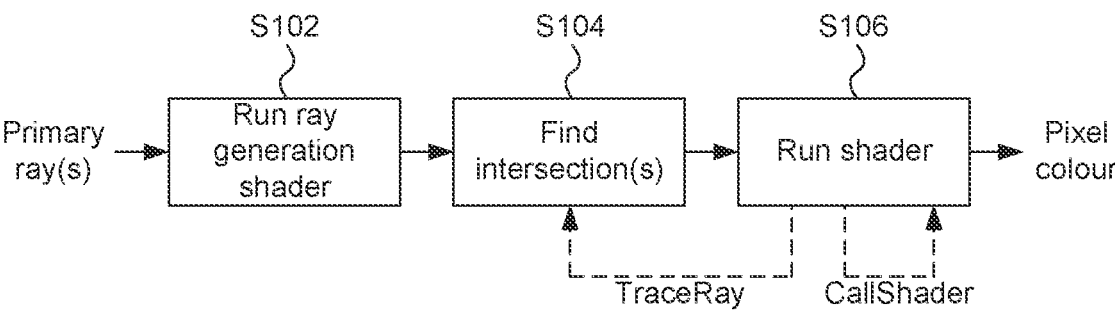
FIG. 1 shows a method of recursively processing rays in a ray tracing system.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art. Embodiments are described by way of example only.

As described in the background section above, shader recursion can be used in a ray tracing system, such that a parent shader invokes a child shader. A parent shader invokes a child shader when the parent shader executes a shader recursion instruction. The term "shader recursion instruction" is used herein to refer to any instruction in a shader which invokes another shader. Examples of shader recursion instructions are: (i) "TraceRay" instructions which cause rays to be emitted and cause intersection testing to be performed for the emitted rays, wherein a shader will be executed on the basis of the results of the intersection testing for the emitted ray; and (ii) "CallShader" instructions which directly invoke another shader (with a callable shader type) to be executed without any ray traversal (i.e. intersection testing) being performed. In some implementations an instruction to invoke an 'any-hit' shader may be a shader recursion instruction, e.g. the DirectX ray tracing specification calls these instructions 'ReportHit' instructions, and the Vulkan ray tracing specification calls these instructions 'OpReportIntersectionKHR' instructions. All of these types of shader recursion instructions result in the invocation of a child shader. When a shader recursion instruction is executed as part of a parent shader to thereby invoke a child shader, some intermediate data for the parent shader is maintained, so that the parent shader can be resumed when the child shader has completed its execution.

Although it may be possible to store the intermediate data in on-chip resources (i.e. on the chip on which the ray tracing unit is implemented), the amount of these on-chip resource would either have to increase dramatically compared to what is normally implemented in non-recursive ray tracing systems or the performance of the ray tracing system would be expected to suffer. Therefore, at least some of the intermediate data (e.g. most or all of the intermediate data) may be stored in an off-chip memory. In particular, devices with limited processing resources (e.g. mobile devices) tend to have insufficient on-chip storage capability to store the intermediate data on-chip, so the intermediate data will tend to be stored in off-chip memory.

In examples described herein a shader is executed for a plurality of rays by executing a task, wherein the task comprises a plurality of instances corresponding to the plurality of rays for which the shader is executed. A task may be executed on a SIMD processing unit such that the instructions of the shader program are executed in parallel for each of the instances of the task.

Rather than writing all of the intermediate data for a parent task (corresponding to a parent shader) to memory (e.g. "dynamic random access memory"—DRAM), it would be possible to keep a parent task in a 'descheduled wait state' on the ray tracing unit whilst all of its child tasks (corresponding to child shaders) and further descendent tasks were executed. When a task is held in a 'descheduled wait state', its intermediate data may be stored in buffers, caches or registers readily accessible to the shader, and/or the shader may remain configured to process that task. However, the whole 'ray-process' operation for processing a primary ray, including executing recursive shaders, is expected to take a significant period of time (maybe in the order of 10,000 processing cycles). If this whole process were done while tasks were in 'descheduled wait states', it would be difficult to have enough tasks running in parallel to achieve a target ray traversal performance. In addition to this, each instance in the original task may intersect with a different primitive which wants to launch a different shader program. So, rather than keeping a parent task in a descheduled wait state while its child tasks are executed, when a shader recursion instruction is executed, the intermediate data for the parent task is written to memory (e.g. DRAM memory) and the parent task is suspended (i.e. its execution is temporarily ended on the ray tracing unit). It may be possible to store the intermediate data in on-chip resources (i.e. memory on the chip on which the ray tracing unit is implemented). That said, in these examples, the amount of this on-chip resource may need to be greater than that which is normally implemented in non-recursive ray tracing systems, or the performance of the ray tracing system would be expected to suffer. Therefore, at least some of the intermediate data (e.g. most or all of the intermediate data) may be stored in an off-chip memory. In particular, devices with limited processing resources (e.g. mobile devices) tend to have insufficient on-chip storage capability to store the intermediate data on-chip, so the intermediate data will tend to be stored in off-chip memory. When its child tasks have completed, the intermediate data for the parent task can be read back from memory, and the execution of the parent task can be resumed. When the parent task is resumed the ray tracing unit re-schedules the parent task to carry on with its execution from the point at which it was suspended.

The intermediate data that is stored for a parent task may comprise: (i) state data, (ii) payload data, and (iii) task information.

The state data represents information about the state of the parent task at the point at which its execution is suspended. For example, the state data may include any data stored in temporary registers (which may be per-instance temporary registers or per-task temporary registers) which will need to be accessible when the task resumes. To give some examples, these temporary registers may store intersection indexes and/or barycentrics. As another example, if multiple rays are cast from an associated intersection to model some form of light scattering, whilst the shader is paused, some form of material properties may be held stored as state data for future ray casts associated with the single intersection, e.g. because it may be the case that only one ray is cast at a time. The material properties could, for example, be refractive indexes, opacity, surface normal.

The payload data is per-instance data relating to individual rays being processed. In particular, the payload data comprises application-defined payload objects for the rays. For example, each ray (i.e. each instance) can have an application defined ray payload. A child shader may be able to modify (i.e. update) the payload data provided by a parent shader. The size of a payload depends on the application (typically it's in the order of three or four double words ("dwords"), e.g. to store a pixel colour which has three or four channels with a 32-bit value (e.g. in a floating point format) per channel, but could potentially be larger or smaller than this). The size of the payload data is not fixed.

The task information is intended to store information about which shader program to re-schedule, at what program offset to resume the program, and define which order the original rays were packed into the task. In other words, the task information for a parent task indicates how the execution of the parent task is to be resumed, e.g. specifying the program counter at which the parent shader program is to resume, and specifying information about the mapping between rays and instances of the task (e.g. using ray IDs).

A simple approach to storing the intermediate state data for a parent task when its execution is suspended would be to store the three types of data (state data, payload data and task information) in three separate allocations of memory, with each memory allocation allowing for the 'worst case' amount of the respective type of data to be stored.

However, according to examples described herein, the memory allocation is managed more flexibly by treating the memory allocation for storing state data and the memory allocation for storing payload data as sets of registers in a unified memory heap, or "pool". In the examples described herein, a "heap" of memory is a portion of continuous off-chip memory that has been reserved for a particular purpose, in this case for storing state data and payload data. There is no fixed split between which registers of the heap are used to store state data and which registers of the heap are used to store payload data. In other words, the same address space is used for state data and for payload data. The registers of the heap of memory can be dynamically allocated for storing either state data or payload data. To put this another way, the heap of memory is shared between payload data and state data such that either type of data (payload or state data) can be allocated to any of the registers in the heap.

When a recursive ray tracing system is configured, an attempt is made to optimise the amount of memory (i.e. the memory footprint) used for storing intermediate data for suspended tasks. Having a unified space for both payload data and state data means the problem of memory footprint optimisation becomes a register reduction problem (or "register allocation" problem). This means that we can make better use of the available memory for storing intermediate data for a shader because the amount of data that is state data and the amount of data that is payload data can vary for different shaders. In particular, the amount of state data and ray payload data being held depends on what needs to be maintained for the parent shader past the shader recursion instruction. Some shaders may have a relatively large amount of state data that is to be maintained with a relatively small amount of payload data, e.g. when tracing shadow rays the payload data may just comprise a Boolean indication of a "hit" or a "miss". In contrast, some other shaders may have relatively small amount of state data and relatively large amount of payload data. By having a unified heap of memory for storing both state data and payload data, the distinction between state data and payload data is blurred in terms of allocating memory. The distinction between state data and ray payload data is what the data represents and how it is used, rather than how it is stored. For example, from the perspective of a given child task, state data for a parent task cannot be modified by the child task, whereas payload data for a parent task may be modified by the child task (or a grandchild task, or some other descendent task, e.g. a great-grandchild task).

In some examples, the task information part of the intermediate data for a parent task may be stored in the same heap of memory as the state data and payload data. However, in other examples, the task information part of the intermediate data for a parent task may be stored in a separate heap of memory. In examples described herein, the task information is managed by fixed-function hardware and it is not expected to be accessed by software, e.g. by the shader programs themselves. For example, the task information may be a minimal amount of information to keep track of a recursion stack for a given ray. In some examples, unlike the state data and payload data, the task information data is not aligned to dword boundaries so the task information data can be packed more tightly.

As mentioned above, the Vulkan and DirectX ray tracing specifications define different types of shaders, including 'ray generation' shaders, 'closest hit' shaders, 'miss' shaders, 'intersection' shaders and 'any hit' shaders. A ray generation shader is run for a primary ray and may include a shader recursion instruction, e.g. a TraceRay instruction, which invokes one or more further (child) shaders. A closest hit shader is run for the closest committed hit (i.e. the closest intersection) found during the whole ray traversal process. A "hit" is said to occur when a ray intersects the geometry of a triangle. However, the ray may not always interact with the triangle. For example, triangles may have transparent portions. A hit is said to be "committed" when it is determined that the ray interacts with the triangle such that further action may need to be taken. For example, a committed hit occurs when a ray intersects with an opaque triangle, or with a partially or wholly opaque portion of a translucent triangle. So a closest hit shader will only be run once for a ray. When the intersection testing module 208 finds an intersection for a ray with an opaque triangle this provides a "committed" hit automatically; whereas when an intersection with a non-opaque primitive is found, an 'any hit' shader is run to determine whether or not to commit the hit. A miss shader is run when the intersection testing for a ray finds no committed hits. An intersection shader is run when the intersection testing module 208 finds an intersection with a "procedural primitive". A procedural primitive may have a complex shape. A procedural primitive may be represented as a bounding volume with a simple geometric shape, such as a box (e.g. an AABB) or a sphere, which bounds the shape of the procedural primitive, so that an intersection testing module can perform intersection testing on the shape of the bounding volume. The application that submits the geometry to the ray tracing system defines the bounding volume (a box or other simple bounding geometric shape) for the procedural primitive. For example, an AABB may be defined by the application with minimum and maximum component values in three dimensions, e.g. in the instance space of the object comprising the procedural primitive. In response to the intersection testing module finding an intersection with the bounding volume for the procedural primitive, the intersection shader is run to determine whether a ray intersects with the shape of the procedural primitive. The intersection testing module may be implemented in fixed-function hardware whereas a shader (e.g. an intersection shader) is implemented in software, so a programmer can define how to find intersections with a procedural primitive having a particular shape by writing a suitable intersection shader, rather than having to define that particular shape of the procedural primitive purely with simple primitive shapes (e.g. triangles) that the intersection testing module is configured to process.

Ray generation shaders, closest hit shaders and miss shaders can include TraceRay instructions. However, 'any hit' shaders and intersection shaders cannot include TraceRay instructions or CallShader instructions.

Figure 2:
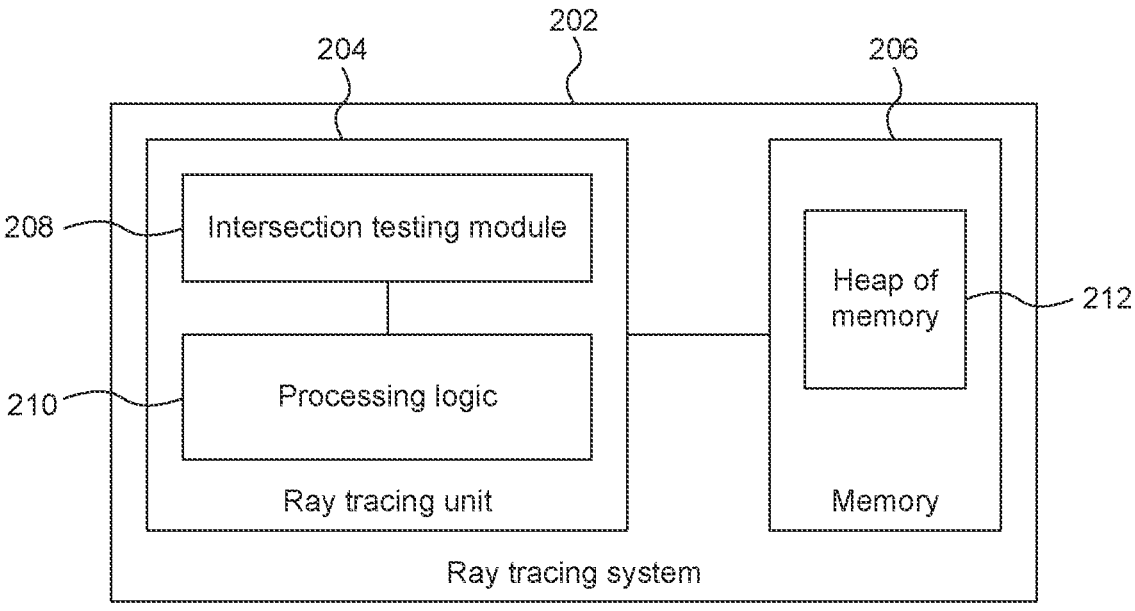
FIG. 2 shows a ray tracing system according to examples described herein.

FIG. 2 illustrates a ray tracing system 202 which comprises a ray tracing unit 204 and a memory 206. For example, the memory 206 may be a dynamic random access memory (DRAM) memory. The ray tracing unit 204 comprises an intersection testing module 208 and processing logic 210. The intersection testing module 208 is configured to perform intersection testing of rays with geometry. The geometry could be associated with nodes of an acceleration structure and may represent regions (e.g. bounding volumes such as axis-aligned bounding boxes (AABBs)) within the scene, or the geometry could be primitives, e.g. triangular primitives, representing surfaces of objects within the scene to be rendered. The intersection testing module 208 may be implemented in hardware, e.g. in fixed-function circuitry, so that it can perform the intersection tests efficiently (e.g. in terms of latency and power consumption). The processing logic 210 is configured to execute computer code, e.g. instructions of shader programs (or other programs). Therefore, the functionality performed by the processing logic 210 is defined by the programs which are executed by the processing logic 210 rather than being defined in the hardware of the processing logic 210. The ray tracing unit 204 may comprise other components which are not shown in FIG. 2, e.g. a module for generating an acceleration structure to represent the objects within the scene. The memory 206 comprises a heap of memory 212 which is a portion of continuous memory that has been reserved for storing state data and payload data. The ray tracing unit 204 may be implemented on an integrated circuit. The ray tracing unit 204 may be implemented on a chip and the memory 206 may not be physically located on the same chip as the ray tracing unit and may be referred to as an "external memory" or an "off-chip memory". The memory may also be referred to as "system memory" and it may be used to store data for other processing units in the system, e.g. a Central Processing Unit (CPU). Data passing between the ray tracing unit 204 and the memory 206 travels over a communications bus within the ray tracing system 202. Compared to the speed at which other operations are performed in the ray tracing unit 204, writing data to the memory 206 and reading data from the memory 206 are slow operations which consume relatively large amounts of power. Therefore, it can be beneficial (in terms of reducing the latency and power consumption of the ray tracing system 202) to reduce the amount of data passing between the ray tracing unit 204 and the memory 206. The rate at which data passes between the memory 206 and the ray tracing unit 204 may be referred to as the "memory bandwidth".

Figure 3:
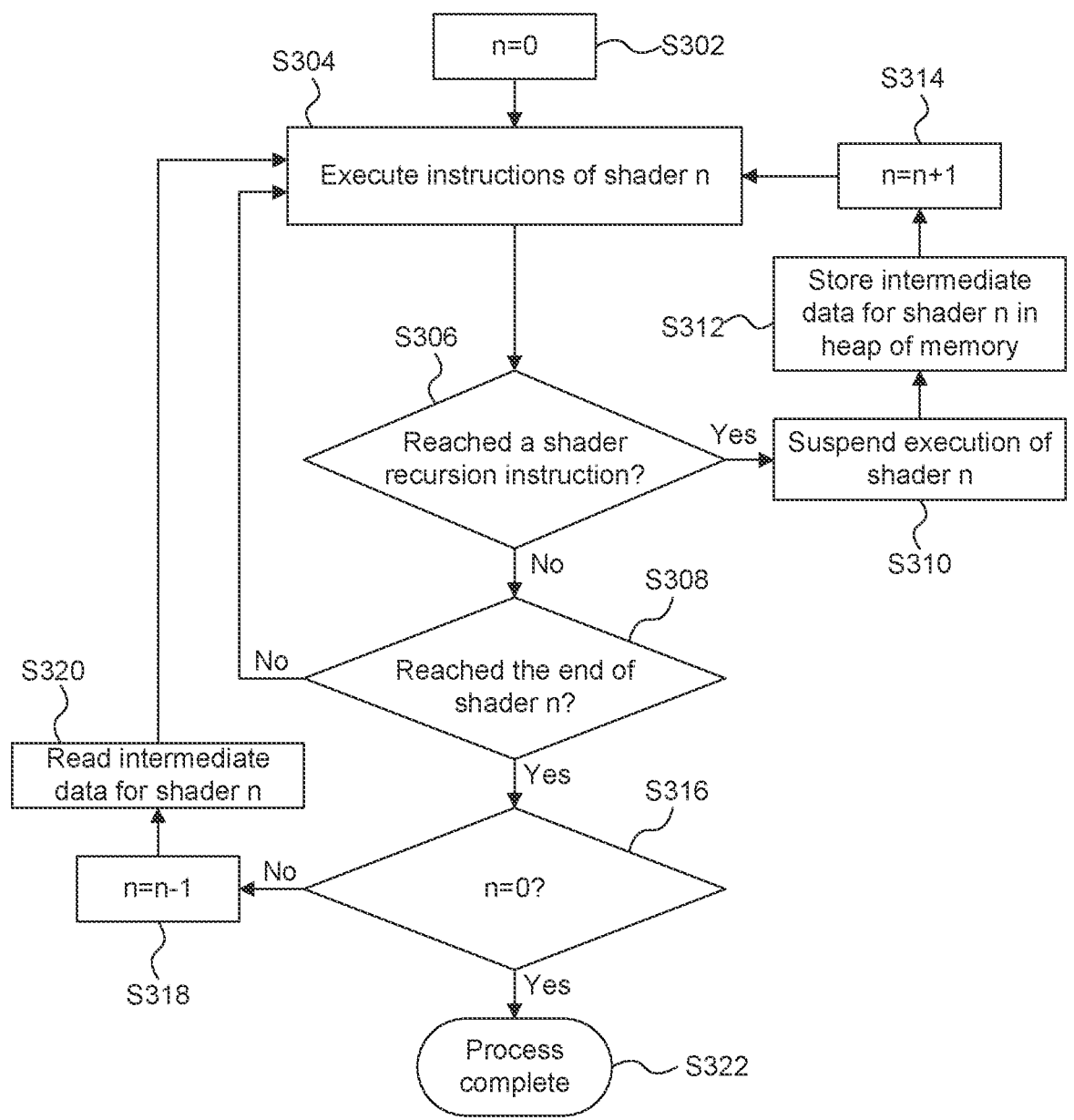
FIG. 3 is a flow chart for a method of recursively processing rays in a ray tracing system according to examples described herein.

FIG. 3 shows a flow chart for a method of processing one or more rays in the ray tracing system 202. In the example described with reference to FIG. 3, multiple rays are processed in parallel by executing tasks which comprise multiple instances, wherein each instance corresponds to a ray for which a shader (i.e. the same shader) is to be executed.

However, it is noted that in other examples, rays are not necessarily processed in parallel.

In step S302 a parameter "n" is set to zero. The parameter n is used to indicate a level, within a sequence of recursively linked shaders, of a shader which is currently active. For example, when n=0, this means that a ray generation shader is active for processing a primary ray.

In step S304 instructions of shader n are executed on the processing logic 210. In particular, on this first iteration, a parent shader is executed for a ray. In this example, the parent shader includes a shader recursion instruction which invokes a child shader. As described above, two examples of shader recursion instructions are TraceRay instructions and CallShader instructions.

In step S306 the processing logic 210 determines whether the execution of the shader has reached a shader recursion instruction. If not, then the method passes to step S308 in which the processing logic 210 determines whether the execution of the shader has reached the end of the shader program, i.e. whether there are no more instructions of the shader still to execute. If not (i.e. if there are still more instructions of shader n to execute) then the method passes back to step S304 and the execution of the instructions of shader n continues.

When shader n reaches a shader recursion instruction, then the method passes from step S306 to step S310. In step S310 the execution of the parent shader (i.e. shader n) for the ray is suspended, i.e. temporarily ended. In this way, the execution of the parent shader is suspended in response to the execution of the shader recursion instruction. The shader recursion instruction indicates payload data for the child shader.

In step S312 intermediate data for the parent shader (i.e. shader n) is stored in a heap of memory. In particular, the state data and the payload data for the parent shader is stored in the heap of memory 212. The task information for the parent shader may be stored in a separate heap (not shown in FIG. 2) within the memory 206. In some examples, some of payload data and/or some of the state data for the parent shader may be stored in a small on-chip memory, with the rest of the payload data and state data for the parent shader being stored in the heap of memory 212. The parent and child shaders both know the format of the data and how much data can be stored in the on-chip memory, so that the parent and child shaders both know where to store/read the data to/from. The heap of memory 212 is used to retain state and to potentially have part of it (i.e. registers allocated for storing payload data) updated by a child shader. The heap of memory 212 is used by shaders to hold information (i.e. state data and payload data) for use past the shader recursion instruction which was reached in step S306. Since the parent shader has been suspended (i.e. ended on the processing logic 210), the current state of the parent shader (including state data and payload data) is retained, so when the parent shader resumes, that state of the parent shader can be restored such that the execution of the parent shader can be resumed.

Step S312 involves allocating a first set of registers in the heap of memory 212 for storing payload data, and allocating a second set of registers in the heap of memory 212 for storing state data. In other words, step S312 can comprise performing a first allocation of a first set of registers in the heap of memory 212 for storing payload data, and performing a second allocation of a second set of registers in the heap of memory 212 for storing state data. The allocated first set of registers and the allocated second set of registers may be separately addressable. The intermediate data is stored in the heap of memory 212 in accordance with the allocations of the first set of registers and the second set of registers. The allocation of the registers of the heap of memory 212 for storing either state data or payload data can be performed dynamically as step S312 is performed, i.e. in real-time. In this example, there is not a fixed allocation of registers of the heap of memory 212 for storing either state data or payload data; instead, the registers of the heap of memory 212 represent a unified, continuous portion of address space of the memory 206 which can be used for storing state data and payload data for suspended shaders, e.g. for suspended tasks.

FIG. 4 shows an example of how registers within the heap of memory 212 can be allocated. In this example, shader data and payload data are stored for a task comprising a plurality of instances. Some registers 402 of the heap 212 are allocated for storing per-instance data and some other registers 404 of the heap 212 are allocated for storing per-task data. "Per-instance data" is data that is relevant for, and can be used by, a particular instance of the task; whereas "per-task data" is data that is relevant for, and can be used by, any of the instances of the task. Payload data is per-instance data because an item of payload data is specific to a particular instance of the task. An example of payload data for an instance is an accumulated colour value associated with the ray corresponding to the instance. State data may be per-instance data or per-task data because some items of state data are specific to particular instances of the task, whereas other items of state data are relevant to all of the instances of the task. An example of per-instance state data for an instance is the current barycentric coordinate within an intersected triangle. An example of per-task state data is an iteration count in a fixed length for a loop. The total number of registers in the heap of memory 212 is fixed, but within the heap 212, the allocation of registers as being either for storing per-instance data (e.g. registers 402) or for storing per-task data (e.g. registers 404) is flexible and can be dynamically determined in real-time. In the example shown in FIG. 4, the per-instance registers 402 are allocated as a first contiguous block of registers within the heap of memory 212 and the per-task registers 404 are allocated as a second contiguous block of registers within the heap of memory 212. In some other examples, there may be a fixed division between the per-instance registers and the per-task registers.

As described above, the task information data for shader n may be stored in a separate heap of memory within the memory 206.

After the intermediate data for shader n (i.e. the parent shader) has been stored in step S312, then in step S314 n is incremented, i.e. the value of n becomes n+1. This means that the child shader is now active. The method then passes back to step S304 in which instructions of the child shader are executed. In this way, the child shader is executed for a ray.

As described above, the shader recursion instruction indicates payload data for the child shader. In other words, the shader recursion instruction can include a pointer to where the payload data is stored in the heap of memory 212. In this way, the indicated payload data may be stored in a subset of registers of the heap of memory 212, and control of the subset of registers is passed from the parent shader to the child shader. The execution of the child shader may update the indicated payload data in the heap of memory 212. If the shader recursion instruction is a TraceRay instruction then the payload data is ray payload data defining data relevant for the child shader to process the ray. If the shader recursion instruction is a CallShader instruction then the payload data may be any type of data that the child shader can update, and is not necessarily related to a ray.

The method proceeds for the child shader from step S304 in the same manner as described above for the parent shader. If the child shader includes a shader recursion instruction then the loop around steps S310 to S314 may be performed again, such that a grandchild shader is invoked for the ray. This recursion may continue up to a maximum recursion depth at which point any further recursion is prevented (not shown in FIG. 3). The API may define the maximum recursion depth. For example, the maximum recursion depth may be 31.

At some point, the method will perform step S308 for the child shader, e.g. when n=1, and it will be determined that the end of the child shader has been reached, such that the 'yes' route is taken from step S308. The payload that was provided to the child shader from the parent shader may have been modified by the execution of the child shader or by the execution of any shaders which are the descendants of the child shader. The method then passes to step S316 in which it is determined whether n=0. In other words, it is determined whether the original parent shader is currently active.

If n is not equal to zero then the method passes from step S316 to step S318 in which the value of n is decremented, i.e. the value of n becomes n−1. For example this may mean that n now equals zero, i.e. this may mean that the parent shader is now active and is ready to resume.

In step S320 the processing logic 210 reads the intermediate data for shader n (e.g. for the parent shader if n=0). For example, the state data and payload data for shader n is read from the heap of memory 212, and the task information for shader n can also be read from the memory 206. The method can then pass back to step S304 in order to execute more instructions of shader n, i.e. instructions of the parent shader after the shader recursion instructions which invoked the child shader. In this way, the execution of the parent shader for the ray is resumed. The task information for shader n is used so that the processing logic 210 can determine the program counter of the next instruction of the parent shader program that is to be executed (which will correspond to the next instruction in the parent shader program after the shader recursion instruction which invoked the child shader).

The method can then proceed as described above from step S304. When the method gets to step S316 and n does equal zero (i.e. the original parent shader is active) then, as indicated in step S322, the processing for the ray is complete. In other words, either the original (parent) shader did not include any recursion and has passed directly from step S306 to step S308 and then to steps S316 and S322, or the parent shader did include recursion and the child shaders have all been executed by passing through steps S304-S308 as many times as necessary before reaching steps S316 and S322. At this point the ray tracing system 202 may have determined a rendered value for a sample position in the rendering space, which may, for example, be a pixel colour value for a pixel of the image being rendered. The ray tracing system can process further rays until all of the pixel values of the image being rendered have been determined. As described above rays may be processed in parallel.

FIG. 5 shows a sequence of three shaders to illustrate how intermediate data is stored in the heap of memory as the ray tracing process proceeds through the sequence of three shaders including a ray generation shader 502, a closest hit shader 504 (which is the child of the ray generation shader 502) and a miss shader 506 (which is the child of the closest hit shader 504). Ray generation shaders do not have incoming payloads, i.e. they do not receive payloads from a parent (or "invoking") shader because ray generation shaders are the first shaders to be executed for primary rays so they do not have parents. Therefore, as shown in the example of FIG. 5, the ray generation shader 502 does not have an incoming payload. However, it does generate a local payload, denoted payload A in FIG. 5.

When a TraceRay instruction of the ray generation shader 502 is executed then the execution of the ray generation shader 502 is suspended and, as shown in FIG. 5, the payload A and state data defining the current state of the ray generation shader 502 is stored in the heap of memory 212. The TraceRay instruction of the ray generation shader 502 invokes the closest hit shader 504 and the local payload of the ray generation shader 502 (payload A) is provided with the TraceRay instruction to the child shader (i.e. to the closest hit shader 504). Therefore, the incoming payload of the closest hit shader 504 in this example is payload A.

The closest hit shader 504 can generate its own local payload, denoted payload B in FIG. 5. The execution of the closest hit shader 504 may modify its incoming payload (i.e. payload A). When a TraceRay instruction of the closest hit shader 504 is executed then the execution of the closest hit shader 504 is suspended and, as shown in FIG. 5, the payload B and state data defining the current state of the closest hit shader 504 is stored in the heap of memory 212 in addition to the payload A and state data defining the current state of the ray generation shader 502. The TraceRay instruction of the closest hit shader 504 invokes the miss shader 506 and either the incoming payload of the closest hit shader 504 (payload A) or the local payload of the closest hit shader 504 (payload B) is provided with the TraceRay instruction to the child shader (i.e. to the miss shader 506). Therefore, the incoming payload of the miss shader 506 in this example is either payload A or payload B.

The miss shader 506 in the example shown in FIG. 5 does not generate its own local payload and does not include a shader recursion instruction. The execution of the miss shader 506 may modify its incoming payload, which may be payload A or payload B. When the miss shader 506 completes then the closest hit shader 504 can resume. When the closest hit shader 504 completes then the ray generation shader 502 can resume. When the ray generation shader 502 completes then a rendered value may have been determined.

It is noted that only closest hit shaders, miss shaders, any hit shaders and callable shaders have incoming payloads. A closest-hit shader, miss shader, any-hit shader or callable shader will have this payload object (i.e. the incoming payload) provided by the shader recursion instruction (e.g. the TraceRay or CallShader instruction) that caused the shader to be invoked. It is further noted that any-hit shaders cannot execute shader recursion instructions, but they do inherit and can potentially modify an incoming payload.

A local ray payload is a local variable that can exist in ray generation shaders, closest-hit shaders, miss shaders or callable shaders. Furthermore, a shader which includes a CallShader instruction may have a local payload. There can be any number of these variables (i.e. local payloads) in these shaders, and any of them can be passed to an instruction call for a shader recursion instruction.

As described with reference to the closest hit shader 504 shown in FIG. 5, the incoming payload (e.g. payload A) may be passed directly to the shader recursion instruction of the closest hit shader 504 which invokes the miss shader 506. In this way, the miss shader 506 has read-write access to its incoming payload which is the local ray payload object associated with the ray generation shader 502. From the perspective of the closest hit shader 504 being a parent shader for the miss shader 506 (which is a child shader), such that the ray generation shader 502 is a grandparent shader, the parent shader (e.g. closest hit shader 504) can provide to its child shader (e.g. miss shader 506) an incoming payload object (e.g. payload A) that the parent shader (e.g. closest hit shader 504) has received from the grandparent shader (e.g. ray generation shader 502) for the ray, and the execution of the child shader (e.g. miss shader 506) for the ray can directly update the incoming payload object (e.g. payload A). In this case, the execution of the child shader (e.g. miss shader 506) for the ray does not update a payload object (e.g. payload B) that is local to the parent shader (e.g. closest hit shader 504).

In another example, as described with reference to the closest hit shader 504 shown in FIG. 5, the local payload (e.g. payload B) may be passed to the shader recursion instruction of the closest hit shader 504 which invokes the miss shader 506. In this way, the miss shader 506 has read-write access to its incoming payload which is the local ray payload object associated with the closest hit shader 504. Again from the perspective of the closest hit shader 504 being a parent shader for the miss shader 506 (which is a child shader), such that the ray generation shader 502 is a grandparent shader, the parent shader (e.g. closest hit shader 504) can provide to its child shader (e.g. miss shader 506) a local payload object (e.g. payload B) that the parent shader (e.g. closest hit shader 504) has generated for the ray, and the execution of the child shader (e.g. miss shader 506) for the ray can update the local payload object (e.g. payload B).

The miss shader 506 is agnostic to which shader its 'incoming ray payload' is local to. It may be a local ray payload associated with its parent (e.g. the closest hit shader 504), or it could be a local ray payload associated with the parent of its parent, or the parent of the parent of its parent, and so on and so on.

Allowing a child shader to directly update the payload that is local to its grandparent shader or great grandparent shader (or any ancestor shader) can be more efficient, in terms of reducing the amount of data that passes between the ray tracing unit 204 and the memory 206, than only allowing a child shader to update a payload that is local to its parent shader. As described above, passing data between the ray tracing unit 204 and the memory 206 is a relatively slow process which consumes a relatively large amount of power compared to other operations which may be performed on the ray tracing unit 204. Furthermore, allowing a child shader to directly update the payload that is local to its grandparent shader or great grandparent shader (or any ancestor shader) can vastly reduce the memory footprint of the heap of memory 212. For example, the heap of memory 212 may be split into a primary section and a secondary section, where the primary section is used by primary shaders (e.g. ray generation shaders) and where the secondary section is used by secondary shaders (e.g. closest-hit, miss or callable shaders). There may be the potential to have many more secondary shaders in flight than there are primary shaders in flight at any given time, so any small saving in the secondary section can have a big saving in the size (i.e. memory footprint) of the overall heap of memory 212. For example, if all of the shaders use 'incoming payloads' (rather than local payloads) in their TraceRay calls this would imply that the secondary section of the heap of memory 212 only needs to store state data, and no payload data.

In some examples, what is 'state data' for one task might become 'payload data' for another task, e.g. when there are multiple rays waiting to be traced. For example, if a parent task calls multiple child tasks then the 'state data' for one of the child tasks may be 'payload data' for a different one of the child tasks. In this way, what is considered to be state data to a first child task, may be considered to be payload data to a second child task, and may be edited by the second child task. For example, if shader 502 called multiple TraceRays to invoke multiple secondary shaders, each would have its own local payload, and each secondary shader would treat the other local payloads as state data. So having state data and payload data in the same memory space (e.g. in the heap of memory 212) avoids any need to move data around when calling separate shader recursion instructions which accept different payloads.

In some examples the per-instance registers 402 may be allocated such that all of the per-instance data is stored for a first instance of a task in a first contiguous group of the per-instance registers 402 and then all of the per-instance data is stored for a second instance of the task in a second contiguous group of the per-instance registers 402, and so on. However, in other examples, which are described below with reference to FIGS. 6a and 6b, the per-instance registers 402 may be grouped and interleaved for storing per-instance data from different instances of the task. For example, rather than storing all of the per-instance data for one instance and then storing all of the per-instance data for the next instance and so on, the per-instance data is divided into subsets (or "groups") which can be stored in different groups of per-instance registers in the heap of memory 212. For example, a first particular type of per-instance data for different instances within a task can be stored in consecutive memory locations, and then a second particular type of payload data for different instances within a task can be stored in the next consecutive memory locations. For example, the per-instance data may be divided into four subsets: (i) origin and direction data, (ii) temporary register data, (iii) parent payload data, and (iv) child payload data.

The per-instance registers 402 are grouped into groups which have a common grouping factor. The grouping factor indicates how many registers are used to store per-instance data for an instance before moving on to the per-instance data of the next instance. In this way, the per-instance data for instances within a task is stored in registers in an interleaved manner. As described above, the per-instance data may comprise payload data and/or state data.

FIG. 6a shows per-instance data for a ray which has been grouped into four subsets for storage in fifteen per-instance registers numbered 0 to 14. The first subset comprises the origin and direction data for a ray, and six of the per-instance registers may be allocated for storing this origin and direction data, so the grouping factor ("GF") for the first subset is six. The second subset comprises data from temporary registers for a ray, and in this example, two of the per-instance registers are allocated for storing this temporary register data, so the grouping factor ("GF") for the second subset is two. The third subset comprises parent payload data (which may be referred to as "incoming payload" data) for a ray, and in this example, three of the per-instance registers are allocated for storing this parent payload data, so the grouping factor ("GF") for the third subset is three. The fourth subset comprises child payload data (which is the payload data that is provided to, and may be modified by, a child shader) for a ray, and in this example, four of the per-instance registers in the heap of memory 212 are allocated for storing this child payload data, so the grouping factor ("GF") for the fourth subset is four.

Figure 6B:
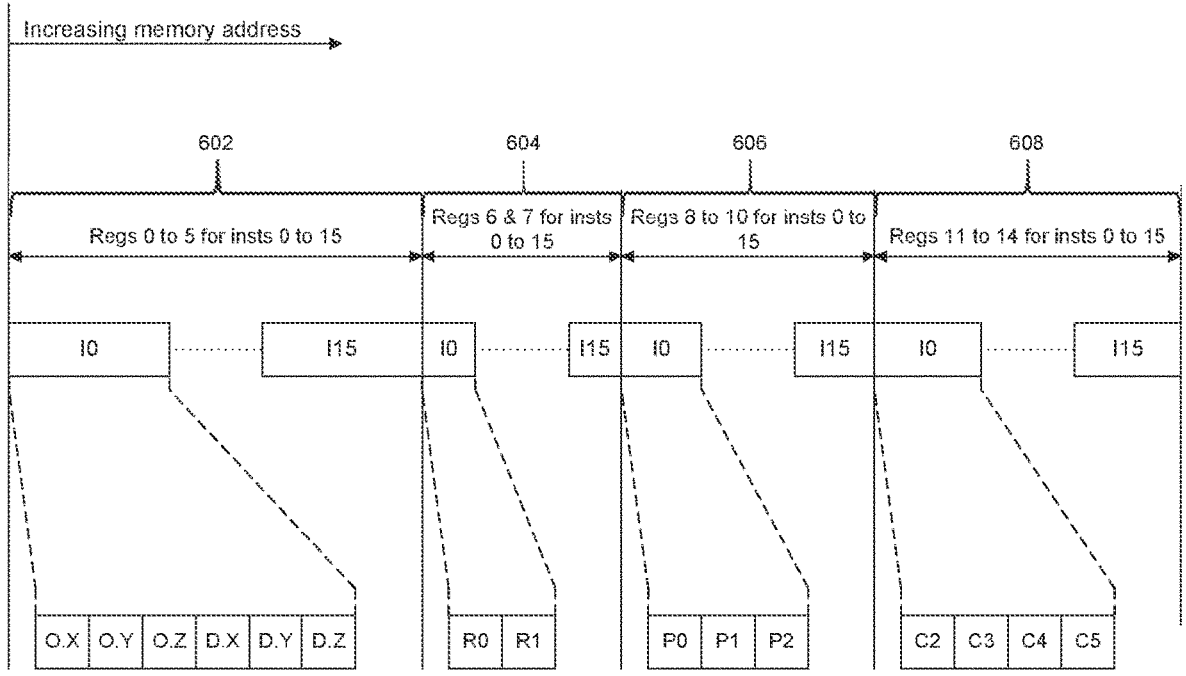
FIG. 6*b* shows how contiguous groups of per-instances registers in the heap of memory can be allocated for storing subsets of per-instance data for the instances of a task.

FIG. 6b shows how contiguous groups of per-instance registers in the heap of memory 212 can be allocated for storing subsets of per-instance data for the instances of a task. A compiler may control the grouping and interleaving of the per-instance registers. A particular group of contiguous per-instance registers is allocated for storing a respective particular subset of the per-instance data for each of the instances of the task, such that the subsets of per-instance data for different instances of the task are interleaved. FIG. 6b shows memory addresses of the registers increasing from left to right within a contiguous block of memory 402 used to store per-instance data. In this example, the task comprises sixteen instances. It is noted that in other examples, the task may comprise a different number of instances, and typically might include more than sixteen instances, e.g. a task may include 32, 64, 128 or 256 instances to give just a few examples.

The first subset of per-instance data (which in this example comprises the origin and direction data to be stored in six registers) is stored for each of the sixteen instances in turn. As shown in FIG. 6b, a first group of per-instance registers 602 is used to store the origin and direction data for each of the instances of the task. In particular, the first six registers in the first group of per-instance registers 602, denoted "O.X", "O.Y", "O.Z", "D.X", "D.Y" and "D.Z", are used to store the origin and direction data for a first instance (instance "I0"). The next six registers in the memory address space of the first group of per-instance registers 602 are used to store the origin and direction data for a second instance (instance "I1"). These allocations continue for each instance in turn until all of the instances in the task have had their origin and direction data allocated for storage in the first group of per-instance registers 602. Also as shown in FIG. 6b, a second group of per-instance registers 604 is used to store the temporary register data for each of the instances of the task. In particular, the first two registers in the second group of per-instance registers 604, denoted "R0" and "R1", are used to store the temporary register data for the first instance (instance "I0"). The next two registers in the memory address space of the second group of per-instance registers 604 are used to store the temporary register data for the second instance (instance "I1"). These allocations continue for each instance in turn until all of the instances in the task have had their temporary register data allocated for storage in the second group of per-instance registers 604. Also as shown in FIG. 6b, a third group of per-instance registers 606 is used to store the parent payload data for each of the instances of the task. In particular, the first three registers in the third group of per-instance registers 606, denoted "P0", "P1" and "P2", are used to store the parent payload data for the first instance (instance "I0"). The next three registers in the memory address space of the third group of per-instance registers 606 are used to store the parent payload data for the second instance (instance "I1"). These allocations continue for each instance in turn until all of the instances in the task have had their parent payload data allocated for storage in the third group of per-instance registers 606. Also as shown in FIG. 6b, a fourth group of per-instance registers 608 is used to store the child payload data for each of the instances of the task. In particular, the first four registers in the fourth group of per-instance registers 608, denoted "C2", "C3", "C4" and "C5", are used to store child payload data for the first instance (instance "I0"). In this example, the child payload data for an instance comprises 6 dwords of data which are stored in six registers respectively, denoted C0 to C5, wherein registers C0 and C1 are on-chip registers and registers C2 to C5 are in the heap of memory 212 as shown in FIG. 6b. The next four registers in the memory address space of the fourth group of per-instance registers 608 are used to store the child payload data for the second instance (instance "I1"). These allocations continue for each instance in turn until all of the instances in the task have had their child payload data allocated for storage in the fourth group of per-instance registers 608.

According to the allocation of the per-instance registers shown in FIGS. 6a and 6b, each of the subsets of per-instance data comprises data of a respective particular type, such that per-instance data of a first type is stored for the instances of the task in a first group of contiguous per-instance registers in the heap of memory, and per-instance data of a second type is stored for the instances of the task in a second group of contiguous per-instance registers in the heap of memory.

As described above, the fourth group of contiguous per-instance registers 608 comprises per-instance registers allocated for storing child payload data for each of the instances of a parent task. A child task will access the child payload data from the per-instance registers 608 by accessing the fourth group of contiguous per-instance registers 608. The child task can access this data as a fetch of data from a contiguous block of memory from the heap of memory 212 without necessarily accessing other per-instance data. It is likely that not all of the registers will need to be accessed by each task, so by separating the subsets of per-instance data for the instances of a task based on the type of that data, relevant data can be fetched from consecutive memory locations of the heap of memory for a task without needing to fetch as much (if any) other data that is not needed by the task. It is noted that there is often a minimum amount of memory that can be fetched from a memory (which may be referred to as a memory "burst" size), and this minimum amount of memory may be larger than the amount of data in one of the subsets of data for a single instance.

In other examples, the groups of per-instance registers could be formed in other ways. For example, the temporary register data could be split into different subsets for different types of temporary register data. For example, the compiler could determine which temporary registers need to be accessed within a loop, and then these temporary registers could be considered a separate group. In other words, it may be determined that a first subset of temporary register data is used in a loop operation, and it may be determined that a second subset of temporary register data is not used in the loop operation. In this case, one of the groups of contiguous per-instance registers can comprise per-instance registers allocated for storing the first subset of temporary register data for each of the instances of the task, and another one of the groups of contiguous per-instance registers can comprise per-instance registers allocated for storing the second subset of temporary register data for each of the instances of the task. This would allow a task to fetch the data for the temporary registers that are needed (and not for temporary registers that are not needed) for the task on each iteration of the loop.

Figure 7:
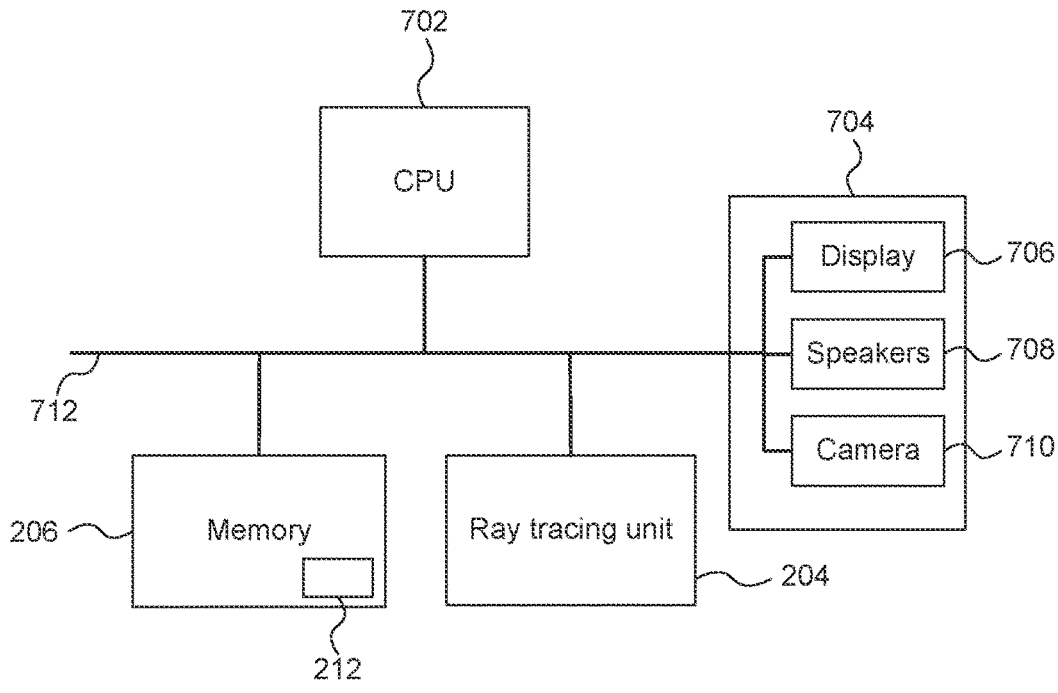
FIG. 7 shows a computer system in which a ray tracing unit is implemented.

FIG. 7 shows a computer system in which the ray tracing systems described herein may be implemented. The computer system comprises a CPU 702, the memory 206, the ray tracing unit 204 and other devices 704, such as a display 706, speakers 708 and a camera 710. The memory 206 comprises the heap of memory 212. The components of the computer system can communicate with each other via a communications bus 712.

The ray tracing systems of FIG. 2 is shown as comprising a number of functional blocks. This is schematic only and is not intended to define a strict division between different logic elements of such entities. Each functional block may be provided in any suitable manner. It is to be understood that intermediate values described herein as being formed by a ray tracing system need not be physically generated by the ray tracing system at any point and may merely represent logical values which conveniently describe the processing performed by the ray tracing system between its input and output.

The ray tracing systems described herein may be embodied in hardware on an integrated circuit. The ray tracing systems described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be or comprise any kind of general purpose or dedicated processor, such as a CPU, GPU, NNA, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed (i.e. run) in an integrated circuit manufacturing system configures the system to manufacture a ray tracing system configured to perform any of the methods described herein, or to manufacture a ray tracing system comprising any apparatus described herein. An integrated circuit definition dataset may be, for example, an integrated circuit description.

Therefore, there may be provided a method of manufacturing, at an integrated circuit manufacturing system, a ray tracing system as described herein. Furthermore, there may be provided an integrated circuit definition dataset that, when processed in an integrated circuit manufacturing system, causes the method of manufacturing a ray tracing system to be performed.

An integrated circuit definition dataset may be in the form of computer code, for example as a netlist, code for configuring a programmable chip, as a hardware description language defining hardware suitable for manufacture in an integrated circuit at any level, including as register transfer level (RTL) code, as high-level circuit representations such as Verilog or VHDL, and as low-level circuit representations such as OASIS® and GDSII. Higher level representations which logically define hardware suitable for manufacture in an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a ray tracing system will now be described with respect to FIG. 8.

Figure 8:
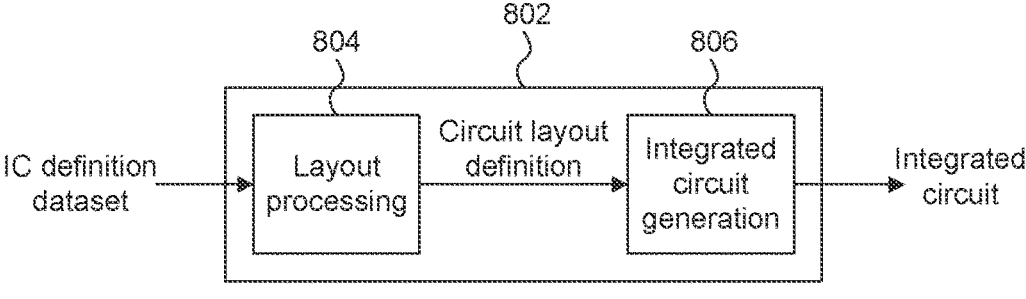
FIG. 8 shows an integrated circuit manufacturing system for generating an integrated circuit embodying a ray tracing system as described herein.

FIG. 8 shows an example of an integrated circuit (IC) manufacturing system 802 which is configured to manufacture a ray tracing system as described in any of the examples herein. In particular, the IC manufacturing system 802 comprises a layout processing system 804 and an integrated circuit generation system 806. The IC manufacturing system 802 is configured to receive an IC definition dataset (e.g. defining a ray tracing system as described in any of the examples herein), process the IC definition dataset, and generate an IC according to the IC definition dataset (e.g. which embodies a ray tracing system as described in any of the examples herein). The processing of the IC definition dataset configures the IC manufacturing system 802 to manufacture an integrated circuit embodying a ray tracing system as described in any of the examples herein.

The layout processing system 804 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 804 has determined the circuit layout it may output a circuit layout definition to the IC generation system 806. A circuit layout definition may be, for example, a circuit layout description.

The IC generation system 806 generates an IC according to the circuit layout definition, as is known in the art. For example, the IC generation system 806 may implement a semiconductor device fabrication process to generate the IC, which may involve a multiple-step sequence of photo litho-graphic and chemical processing steps during which elec-tronic circuits are gradually created on a wafer made of semiconducting material. The circuit layout definition may be in the form of a mask which can be used in a lithographic process for generating an IC according to the circuit defi-nition. Alternatively, the circuit layout definition provided to the IC generation system 806 may be in the form of computer-readable code which the IC generation system 806 can use to form a suitable mask for use in generating an IC.

The different processes performed by the IC manufactur-ing system 802 may be implemented all in one location, e.g. by one party. Alternatively, the IC manufacturing system 802 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a ray tracing system without the IC definition dataset being pro-cessed so as to determine a circuit layout. For instance, an integrated circuit definition dataset may define the configu-ration of a reconfigurable processor, such as an FPGA, and the processing of that dataset may configure an IC manu-facturing system to generate a reconfigurable processor having that defined configuration (e.g. by loading configu-ration data to the FPGA).

In some embodiments, an integrated circuit manufactur-ing definition dataset, when processed in an integrated circuit manufacturing system, may cause an integrated cir-cuit manufacturing system to generate a device as described herein. For example, the configuration of an integrated circuit manufacturing system in the manner described above with respect to FIG. 8 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 8, the IC generation system may further be configured by an integrated circuit definition dataset to, on manufacturing an integrated circuit, load firmware onto that integrated circuit in accordance with program code defined at the integrated circuit definition dataset or otherwise provide program code with the inte-grated circuit for use with the integrated circuit.

The implementation of concepts set forth in this applica-tion in devices, apparatus, modules, and/or systems (as well as in methods implemented herein) may give rise to perfor-mance improvements when compared with known imple-mentations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing func-tional blocks in a serialised fashion or sharing functional blocks between elements of the devices, apparatus, modules and/or systems. Conversely, concepts set forth in this appli-cation that give rise to improvements in the physical imple-mentation of the devices, apparatus, modules, and systems (such as reduced silicon area) may be traded for improved performance. This may be done, for example, by manufac-turing multiple instances of a module within a predefined area budget.

The applicant hereby discloses in isolation each indi-vidual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A method of processing rays in a ray tracing system, the method comprising:

executing a parent shader for a ray, wherein the parent shader includes a shader recursion instruction which invokes a child shader;

suspending the execution of the parent shader for the ray;

storing intermediate data for the parent shader in a heap of memory, wherein the intermediate data comprises state data and payload data, wherein said storing inter-mediate data comprises allocating a first set of registers in the heap of memory for storing the payload data, and allocating a second set of registers in the heap of memory for storing the state data; and when the parent shader is ready to resume, reading intermediate data for the parent shader from the heap of memory, and resuming the execution of the parent shader for the ray.

2. The method of claim 1, further comprising executing the child shader for the ray, whilst the parent shader is suspended.

3. The method of claim 1, wherein the shader recursion instruction indicates payload data for the child shader.

4. The method of claim 3, further comprising executing the child shader for the ray, whilst the parent shader is suspended, and wherein the execution of the child shader for the ray updates at least some of the indicated payload data.

5. The method of claim 3, further comprising passing control of a subset of registers of the heap of memory from the parent shader to the child shader, wherein the subset of registers stores the indicated payload data.

6. The method of claim 3, further comprising executing the child shader for the ray, whilst the parent shader is suspended, and wherein the indicated payload data is an incoming payload object that the parent shader has received from a grandparent shader for the ray, wherein the execution of the child shader for the ray directly updates the incoming payload object.

7. The method of claim 6, wherein the execution of the child shader for the ray does not update a payload object that is local to the parent shader.

8. The method of claim 3, further comprising executing the child shader for the ray, whilst the parent shader is suspended, and wherein the indicated payload data is a local payload object that the parent shader has generated for the ray, wherein the execution of the child shader for the ray updates the local payload object.

9. The method of claim 1, wherein a shader is executed for a plurality of rays by executing a task, wherein the task comprises a plurality of instances corresponding to the plurality of rays for which the shader is executed.

10. The method of claim 9, wherein the registers in the heap of memory are allocated for storing either per-instance data or per-task data.

11. The method of claim 10, wherein the per-instance data comprises one or both of state data and payload data, and wherein the per-task data comprises state data.

12. The method of claim 10, wherein groups of contiguous per-instance registers in the heap of memory are allocated for storing subsets of the per-instance data for the instances of the task, wherein a particular group of contiguous per-instance registers is allocated for storing a respective particular subset of the per-instance data for each of the instances of the task.

13. The method of claim 12, wherein each of the subsets of the per-instance data comprises data of a respective particular type, such that per-instance data of a first type is stored for the instances of the task in a first group of contiguous per-instance registers in the heap of memory, and per-instance data of a second type is stored for the instances of the task in a second group of contiguous per-instance registers in the heap of memory.

14. The method of claim 12, wherein the parent shader is executed by executing a parent task, and the child shader is executed by executing a child task, and wherein one of the groups of contiguous per-instance registers comprises per-instance registers allocated for storing child payload data for each of the instances of the parent task, and wherein the child task accesses the child payload data by accessing said one of the groups of contiguous per-instance registers.

15. The method of claim 12, wherein there are four groups of contiguous per-instance registers, wherein:

a first of the groups of contiguous per-instance registers comprises per-instance registers allocated for storing ray origin and direction data for each of the instances of the task, a second of the groups of contiguous per-instance registers comprises per-instance registers allocated for storing temporary register data for each of the instances of the task, a third of the groups of contiguous per-instance registers comprises per-instance registers allocated for storing parent payload data for each of the instances of the task, and a fourth of the groups of contiguous per-instance registers comprises per-instance registers allocated for storing child payload data for each of the instances of the task.

16. The method of claim 12, further comprising:

determining that a first subset of temporary register data is used in a loop operation; and determining that a second subset of temporary register data is not used in the loop operation;

wherein one of the groups of contiguous per-instance registers comprises per-instance registers allocated for storing the first subset of temporary register data for each of the instances of the task, and wherein another one of the groups of contiguous per-instance registers comprises per-instance registers allocated for storing the second subset of temporary register data for each of the instances of the task.

17. A ray tracing system configured to process rays, wherein the ray tracing system comprises:

processing logic; and a heap of memory;

wherein the processing logic is configured to:

execute a parent shader for a ray, wherein the parent shader includes a shader recursion instruction which invokes a child shader;

suspend the execution of the parent shader for the ray;

identify intermediate data for the parent shader which is to be stored in the heap of memory, wherein the intermediate data comprises state data and payload data, allocate a first set of registers in the heap of memory for storing the payload data;

allocate a second set of registers in the heap of memory for storing the state data;

cause the intermediate data to be stored in the heap of memory in accordance with the allocations of the first set of registers and the second set of registers; and when the parent shader is ready to resume, read intermediate data for the parent shader from the heap of memory, and resume the execution of the parent shader for the ray.

18. The ray tracing system of claim 17, wherein the shader recursion instruction indicates payload data for the child shader, and wherein the processing logic is further configured to pass control of a subset of registers of the heap of memory from the parent shader to the child shader, wherein the subset of registers stores the indicated payload data.

19. The ray tracing system of claim 17, wherein the processing logic is configured to execute a shader for a plurality of rays by executing a task, wherein the task comprises a plurality of instances corresponding to the plurality of rays for which the shader is executed.

20. A non-transitory computer readable storage medium having stored thereon computer readable instructions that, when executed at a computer system, cause the computer system to perform a method of processing rays in a ray tracing system, the method comprising:

executing a parent shader for a ray, wherein the parent shader includes a shader recursion instruction which invokes a child shader;

suspending the execution of the parent shader for the ray;

storing intermediate data for the parent shader in a heap of memory, wherein the intermediate data comprises state data and payload data, wherein said storing intermediate data comprises allocating a first set of registers in the heap of memory for storing the payload data, and allocating a second set of registers in the heap of memory for storing the state data; and when the parent shader is ready to resume, reading intermediate data for the parent shader from the heap of memory, and resuming the execution of the parent shader for the ray.

* * * * *